(12) United States Patent
Ahn et al.

(10) Patent No.: US 11,080,325 B2
(45) Date of Patent: Aug. 3, 2021

(54) SERVER AND OPERATING METHOD THEREOF

(71) Applicant: HYPERCONNECT, INC., Seoul (KR)

(72) Inventors: Sangil Ahn, Cheongju-si (KR); Beomjun Shin, Seoul (KR); Minsik Oh, Seoul (KR); Eunhee Choi, Seoul (KR)

(73) Assignee: Hyperconnect, Inc., Seoul (KR)

( * ) Notice: Subject to any disclaimer, the term of this patent is extended or adjusted under 35 U.S.C. 154(b) by 113 days.

(21) Appl. No.: 16/268,924

(22) Filed: Feb. 6, 2019

(65) Prior Publication Data

US 2019/0251118 A1 Aug. 15, 2019

(30) Foreign Application Priority Data

Feb. 14, 2018 (KR) .......................... 10-2018-0018563

(51) Int. Cl.
*G06F 16/30* (2019.01)
*G06F 16/532* (2019.01)
*G06F 16/9032* (2019.01)
*G06T 5/50* (2006.01)
*G06F 17/18* (2006.01)
(Continued)

(52) U.S. Cl.
CPC ...... *G06F 16/532* (2019.01); *G06F 16/90324* (2019.01); *G06F 17/18* (2013.01); *G06N 3/08* (2013.01); *G06N 20/00* (2019.01); *G06T 5/00* (2013.01); *G06T 5/50* (2013.01); *G06T 2207/20081* (2013.01)

(58) Field of Classification Search
CPC .......................... G06F 16/532; G06F 16/90324

USPC ........ 707/609, 687, 705, 768, 790, 813, 821
See application file for complete search history.

(56) References Cited

U.S. PATENT DOCUMENTS 9,225,897 B1 12/2015 Sehn
9,230,328 B1 1/2016 Wotzlaw
(Continued)

FOREIGN PATENT DOCUMENTS

EP 2 782 326 A2 9/2014
EP 3 035 283 A1 6/2016
(Continued)

OTHER PUBLICATIONS

Dou et al., "Coarse-to-Fine Trained Mufti-Scale Convolutional Neural Networks for Image Classification", IEEE, 2015, 7 pages.
(Continued)

*Primary Examiner* — Sana A Al-Hashemi
(74) *Attorney, Agent, or Firm* — KPPB LLP

(57) ABSTRACT

A server may include a communicator for receiving an image from a subject terminal from among a plurality of terminals; and a controller for identifying a type of a content included in the received image, and for controlling two or more different image filters using a recommended algorithm regarding an image filter to be applied to the image, wherein the controller may select a first image filter predicted to have a highest probability to be selected by a user of the subject terminal and a second image filter predicted to have a second highest probability to be selected by the user of the subject terminal using the recommended algorithm, and the communicator may transmit information on the first image filter and information on the second image filter to the subject terminal.

14 Claims, 14 Drawing Sheets

(51) Int. Cl.
*G06N 20/00* (2019.01)
*G06N 3/08* (2006.01)
*G06T 5/00* (2006.01)

(56) References Cited

U.S. PATENT DOCUMENTS

| | | | |
|---|---|---|---|
| 2010/0054592 A1* | 3/2010 | Nanu | H04N 5/23219 |
| | | | 382/167 |
| 2012/0155759 A1 | 6/2012 | Kang et al. | |
| 2014/0176732 A1 | 6/2014 | Cohen et al. | |
| 2015/0370474 A1 | 12/2015 | Belaunde et al. | |
| 2016/0127653 A1 | 5/2016 | Lee et al. | |

FOREIGN PATENT DOCUMENTS

| | | |
|---|---|---|
| JP | 2012-018571 A | 1/2012 |
| JP | 2017-228224 A | 12/2017 |
| WO | 2015162647 A1 | 10/2015 |
| WO | 2016112299 A1 | 7/2016 |

OTHER PUBLICATIONS

Communication dated Apr. 24, 2019 by the European Patent Office in application No. 19156400.4.

* cited by examiner

SERVER AND OPERATING METHOD THEREOF

CROSS-REFERENCE TO THE RELATED APPLICATION

This application claims priority from Korean Patent Application No. 10-2018-0018563, filed on Feb. 14, 2018, the disclosure of which is incorporated herein in its entirety by reference.

BACKGROUND

1. Field

The disclosed embodiments relate to a server capable of recommending two or more image filters predicted to be selected by a user according to a content included in an image that the user intends to photograph, and an operating method thereof.

2. Description of the Related Art

As communication technologies develop and electronic devices become miniaturized, personal terminals are coming into wide use for general consumers. Especially, in recent days, portable personal terminals such as smart phones or smart tablet PCs are becoming widely used. Most of the terminals contain image photographing technology. Using the terminal, a user may photograph an image that includes various contents.

Further, the user may correct the photographed image using various applications downloadable onto the terminal. For example, the user may correct the photographed image using various image filters being provided from the applications. Since there are various image filters being provided through the applications, it may be difficult for the user to apply all the image filters to the photographed image. Further, the user may not know which image filter is most appropriate to the content included in the photographed image.

SUMMARY

According to the disclosed embodiments, there may be provided a server that is capable of recommending two or more image filters appropriate to a content included in an image to be photographed by a user, and an operating method thereof.

Further, according to the embodiments, there may be provided a server capable of improving convenience of the user by automatically recommending two or more image filters, and an operating method thereof.

An operating method of a server according to embodiments of the present disclosure may include receiving an image from a subject terminal from among a plurality of terminals; identifying a type of a content included in the received image; preparing a recommended algorithm regarding an image filter applicable to the image; selecting two or more different image filters corresponding to the type of the content using the recommended algorithm; and transmitting information on the selected two or more image filters to the subject terminal.

According to the embodiments, the operating method of the server may further include preparing a learning model for the identifying the type of the content included in the image, the model being learned regarding a correlation between image data of numerous photographs and types of contents included in the numerous photographs, prior to the identifying the type of the content included in the image.

According to the embodiments, the operating method of the server may further include receiving, from the subject terminal, user information that includes at least one of hobby information, gender information, age information, and information on a type of a preferred image filter of a user of the subject terminal.

According to the embodiments, the preparing the recommended algorithm regarding the image filter to be applied to the image may include receiving the user information and an image from each of at least one of the plurality of terminals except the subject terminal; identifying a type of a content included in the image received from each of the at least one terminal; receiving, from each of the at least one terminal, information on the type of the image filter selected to be applied to the image; and preparing a learning model using the user information, information on the identified type of the content, and the received information on the type of the image filter.

According to the embodiments, the preparing the learning model using the user information, information on the identified type of the content, and the received information on the type of the image filter may include preparing the learning model for selecting the two or more different image filters regarding a correlation between the user information, and information on the identified type of the content and the received information on the type of the image filter.

According to the embodiments, the selecting the two or more different image filters corresponding to the type of the content using the recommended algorithm may include selecting the two or more image filters predicted to have a high probability to be selected by the user of the subject terminal using the user information received from the subject terminal, information on the type of the content identified in the image received from the subject terminal and the learning model.

According to the embodiments, the identifying the type of the content included in the received image may include determining that the content included in the image received from the subject terminal is a first content, and the preparing the recommended algorithm regarding the image filter to be applied to the image may include preparing image filter history information on the type of the image filter selected to be applied to the image including the first content received prior to receiving the image from the subject terminal and the image filter history information on the type of the image filter selected to be applied to the image including the first content each received from at least one of the plurality of terminals except the subject terminal.

According to the embodiments, the selecting the two or more different image filters corresponding to the type of the content using the recommended algorithm may include selecting image filter history information that includes a most number of image filters that overlap with the image filters included in the image filter history information received from the subject terminal, of the image filter history information each received from the at least one terminal; and selecting the two or more different image filters based on the image filters that do not overlap with the image filter history information received from the subject terminal of the selected image filter history information.

According to the embodiments, the identifying the type of the content included in the received image may include detecting whether the content may include at least one of a person, certain object, certain animal, certain scenery, certain pattern and certain color.

According to the embodiments, the selecting the two or more different image filters corresponding to the type of the content using the recommended algorithm may include selecting a first image filter predicted to have a highest probability to be selected by the user of the subject terminal and a second image filter predicted to have a second highest probability to be selected by the user of the subject terminal using the recommended algorithm.

A server according to embodiments of the present disclosure may include a communicator for receiving an image from a subject terminal from among a plurality of terminals; and a controller for identifying a type of a content included in the received image, and for selecting two or more different image filters using a recommended algorithm regarding an image filter to be applied to the image, wherein the controller selects a first image filter predicted to have a highest probability to be selected by a user of the subject terminal and a second image filter predicted to have a second highest probability to be selected by the user of the subject terminal using the recommended algorithm, and the communicator transmits information on the first image filter and information on the second image filter to the subject terminal.

According to the embodiments, the controller may determine that the content included in the image received from the subject terminal is a first content, and the communicator may receive image filter history information on the type of the image filter selected to be applied to the image including the first content received prior to receiving the image from the subject terminal and the image filter history information on the type of the image filter selected to be applied to the image including the first content each received from at least one of the plurality of terminals except the subject terminal.

According to the embodiments, the controller may select image filter history information that includes a most number of image filters that overlap with the image filters included in the image filter history information received from the subject terminal of the image filter history information each received from the at least one terminal, and select the two or more different image filters based on the image filters that do not overlap with the image filter history information received from the subject terminal of the selected image filter history information.

According to the embodiments, the communicator may receive user information that includes at least one of hobby information, gender information, age information, and information on a type of a preferred image filter of the user of the subject terminal.

According to the embodiments, the communicator may receive the user information, the image to which the image filter is applied, and information on the type of the image filter of the image to which the image filter is applied from each of at least one of the plurality of terminals except the subject terminal, and the controller may identify the type of the content included in the image to which the image filter is applied, the content being received from each of the at least one terminal, and may prepare the recommended algorithm for selecting the two or more different image filters, the recommended algorithm being learned regarding a correlation between the user information, type of the content identified, and the type of the received image filter.

According to the disclosed embodiments, the two or more different image filters appropriate to the content included in the image to be photographed by the user may be automatically recommended.

Further, according to the embodiments, the two or more different image filters may be automatically recommended, thereby improving convenience of the user.

DETAILED DESCRIPTION

Figure 1:
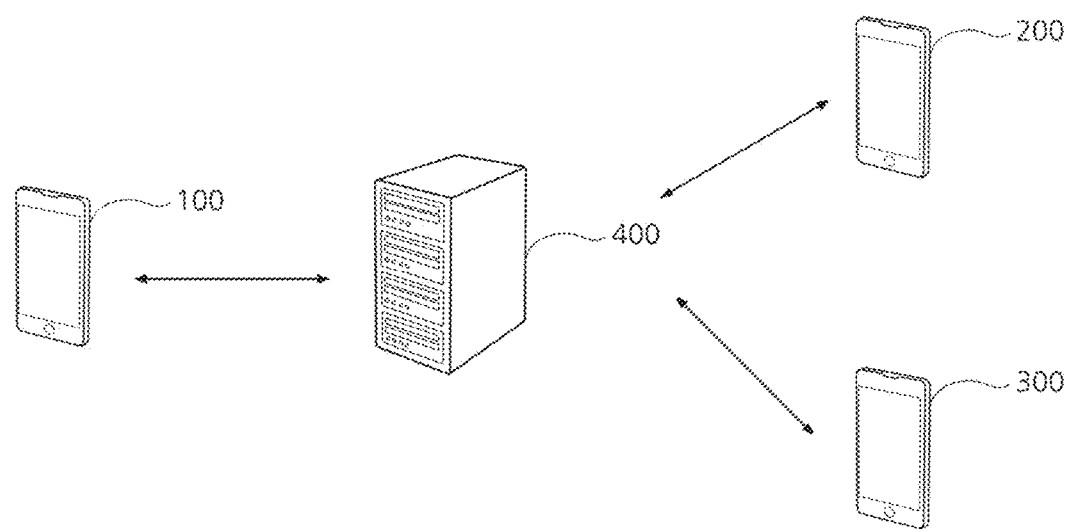
FIG. 1 is a network configuration diagram of an environment where an electronic device operates according to an embodiment of the present disclosure.

The advantages and characteristics of the present disclosure, and the method for achieving those advantages and characteristics will be clarified with reference to the embodiments that will be explained hereinafter together with the drawings attached hereto. However, the present disclosure is not limited to the embodiments disclosed hereinafter, but may be realized in various different forms, and the present embodiments are provided merely for the purpose of complete disclosure of the present disclosure, and for the purpose of informing a person skilled in the art of the scope of the present disclosure, and the present disclosure is to be defined only by the scope of the claims. Like reference numerals indicate like configurative elements through the entirety of the specification.

Even though "a first" or "a second" and the like are used to describe various configurative elements, these configurative elements are not limited by the aforementioned terms. The aforementioned terms can only be used to differentiate one configurative element from other configurative elements. Therefore, a first configurative element mentioned hereinafter may be a second configurative element within the technical idea of the present disclosure.

The terms used in the present specification were used to explain the embodiments, and not to limit the present disclosure. In the present specification, a singular form includes plural forms unless specially mentioned otherwise. "Comprises" or "comprising" used in the present specification imply that the mentioned configurative element or step does not exclude the presence or addition of one or more other configurative element or step.

Unless defined otherwise, all the terms used in the present specification may be construed to mean what may be commonly understood by a person skilled in the art. Further, the terms defined in generally used dictionaries should not be construed ideally or overly unless clearly defined specially.

FIG. 1 is a network configuration diagram of an environment where an electronic device operates according to an embodiment of the present disclosure. Referring to FIG. 1, the environment where a plurality of electronic devices 100~300 operate may include a server 400 and the plurality of electronic devices 100~300. For example, the environment where the plurality of electronic devices 100~300 operate may not include the server 400.

Each of the plurality of electronic devices 100~300 may be connected through medium of the server 400. For convenience of explanation of the present disclosure, three electronic devices are illustrated in FIG. 1. However, the number of the electronic devices is not limited to three. Each of the plurality of electronic devices 100~300 may be embodied as one of desktop computer, laptop computer, smartphone, smart tablet, smart watch, mobile terminal, digital camera, wearable device, and portable electronic device. Each of the plurality of electronic devices 100~300 may execute a program or an application.

Each of the plurality of the electronic devices 100~300 may be connected to a communication network. Each of the plurality of electronic devices 100~300 may be connected to each other or be connected to the server 400 through the communication network. Each of the plurality of electronic devices 100~300 may output data to the other device connected thereto or receive data from the other device.

The communication network connected to each of the plurality of electronic devices 100~300 may include wired communication network, wireless communication network, or composite communication network. The communication network may include mobile communication network such as 3G, LTE or LTE-A, etc. The communication network may include wired or wireless communication network such as Wi-Fi module, UMTS/GPRS and Ethernet, etc. The communication network may include a short-distance network such as Magnetic Secure Transmission (MST), Radio Frequency Identification (RFID), Near Field Communication (NFC), ZigBee, Z-Wave, Bluetooth, Bluetooth Low Energy (BLE) and InfraRed (IR) communication, etc. The communication network may include Local Area Network (LAN), Metropolitan Area Network (MAN) and Wide Area Network (WAN), etc.

The server 400 may store various programs or applications and data so that each user of the plurality of electronic devices 100~300 can correct the photographed image using the plurality of electronic devices 100~300.

Hereinbelow, for convenience of explanation of the present disclosure, the electronic device and terminal may be used to have the same meaning.

Figure 2:
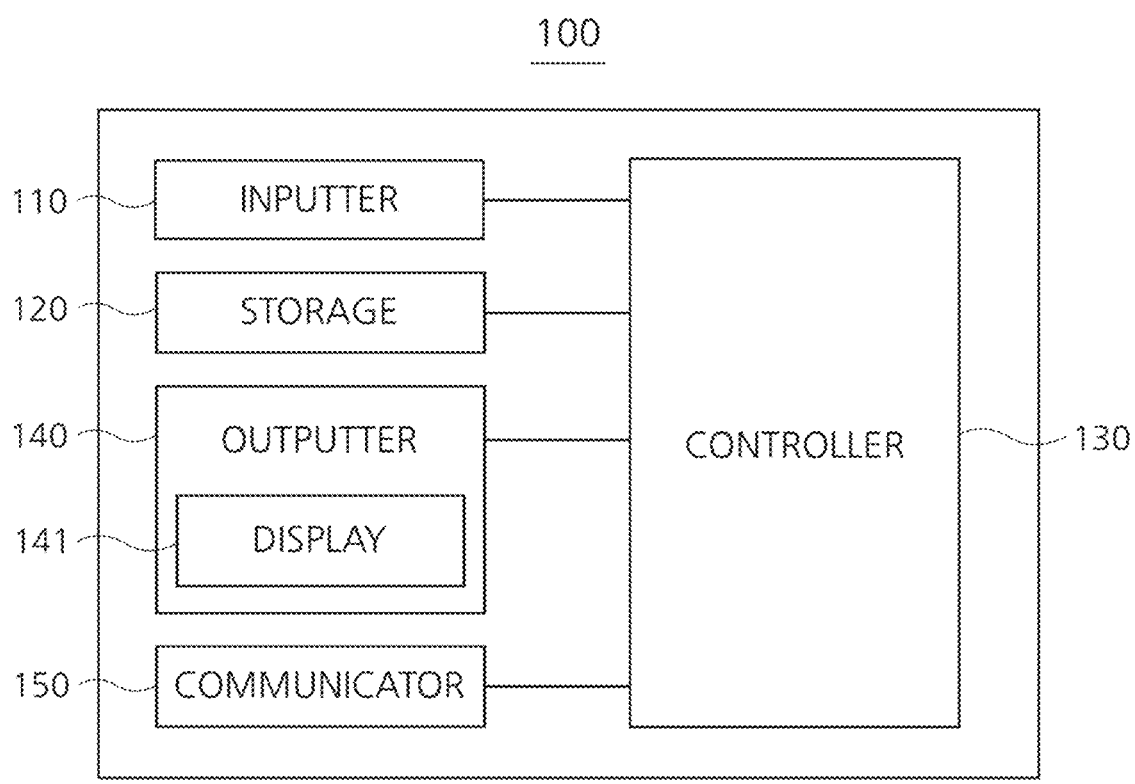
FIG. 2 is a block diagram illustrating a configuration of a terminal according to the embodiment of the present disclosure.

FIG. 2 is a block diagram illustrating a configuration of the terminal according to an embodiment of the present disclosure. Referring to FIG. 2, the first terminal 100 may include an inputter 110, storage 120, controller 130, outputter 140 and communicator 150. Each of a second terminal 200 and third terminal 300 illustrated in FIG. 1 may be embodied similarly or identically to the first terminal 100.

The inputter 110 may receive signals from outside. The inputter 110 may receive the signals from the user of the terminal 100. Further, the inputter 110 may receive the signals from an external device. For example, the inputter 110 may include a microphone, camera, keyboard, mouse, trackball, touchscreen, button, switch, sensor, network interface, or other input devices, etc. The inputter 110 may receive voice from outside through the microphone included in the inputter 110.

Further, the inputter 110 may receive a photographed image from the camera included in the inputter 110 or a gesture from the user. Otherwise, the inputter 110 may receive input of a preview image converted from light reflected from surroundings of the terminal 100. The touchscreen included in the inputter 110 may receive a touch input from the user of the terminal 100. The inputter 110 may receive user information or user input received from the user. For example, the user information may include at least one of hobby information, gender information, age information and preferred image filter information of the user of the terminal 100. Further, the user input may be a touch input being received from the user of the terminal 100.

The storage 120 may store data. The storage 120 may store the voice or image data received from the inputter 110. Further, the storage 120 may store a computation result executed by the controller 130. For example, the storage 120 may store a voice encoded by the controller 130. The storage 120 may the store data to be output externally through the communicator 150 or store the data received from outside through the communicator 150.

The storage 120 may store the user information or user input information received through the inputter 110. The storage 120 may store the image received through the inputter 110. Further, in the case where an image filter is applied to the received image, the storage 120 may store information on the type of the image filter applied to the received image filter together.

The storage 120 may store software or programs. For example, the storage 120 may store applications, programs such as application programming interfaces (API), and various types of data. The storage 120 may store commands that may be executed by the controller 130.

The storage 120 may include at least one of a volatile memory or non-volatile memory. For example, the storage 120 may include at least one of a flash memory, Read Only Memory (ROM), Random Access Memory (RAM), Electrically Erasable ROM (EEROM), Erasable Programmable ROM (EPROM), Electrically Erasable Programmable ROM (EEPROM), Hard Disk Drive (HDD) or register. For example, the storage 120 may include a file system, database, or embedded database, etc.

The controller 130 or each of the configuration elements included in the controller 130 may be embodied in the form of software or hardware. For example, the software may be embodied by program execution commands such as mechanical code, firmware code, embedded code, and application, etc. The hardware may be electric electronic circuit, processor, computer, pressure sensor, inertia sensor, microelectromechanical system (MEMS), passive elements, or a combination thereof.

The controller 130 may control operations of the terminal 100. The controller 130 may be connected with each of the configuration elements included in the terminal 100. The controller 130 may control operations of each of the configuration elements included in the terminal 100. The controller 130 may control the operations of the terminal 100 in response to the signals received by the inputter 110.

The controller 130 may test the preview image being input through the inputter 110. The preview image may mean an image being input through the inputter 110 before the user of the terminal 100 stores the image being input through the inputter 110. For example, the controller 130 may identify a type of the content included in the input preview image.

For example, the content included in the preview image may include one of a person, certain object, certain animal, certain scenery, certain pattern and certain color. More specifically, in the case where the content included in the preview image is a certain object, the controller 130 may identify the type, color or pattern of the object. In the case where the content included in the preview image is a person, the controller 130 may identify the gender, skin color or hair color of the person. The controller 130 may select two or more image filters appropriate to the type of the content included in the preview image using a prepared learning model.

The outputter 140 may include a display 141. The display 141 may display a screen. The controller 130 may control such that the screen is displayed on the display 141. The display 141 may display a user interface. The display 141 may display another screen in response to an input from the user.

The display 141 may display data. The display 141 may display the computation result performed by the controller 130. For example, the display 141 may output the preview image to which the two or more image filters selected by the controller 130 are applied. The display 141 may display the data stored in the storage 120. The display 141 may display the data received by the communicator 150. For example, the display 141 may display the image being received from the inputter 110.

The display 141 may include a flat panel display device such as Liquid Crystal Display (LCD), Organic Light Emitting Diode (OLED), or Plasma Display Panel (PDP), etc. The display 141 may include a curved-surface display or a flexible display. The display 141 may include a touchscreen. In the case where the display 141 includes the touchscreen, the display 141 may operate as the inputter 110 at the same time as performing the output operations.

The outputter 140 may output sound. The outputter 140 may output the sound received through the inputter 110 or the sound received through an external device. For example, the outputter 140 may include a speaker.

The communicator 150 may output data outside of the terminal 100 or receive data from outside. The communicator 150 may output the data to the server 400 or to an external device. The communicator 150 may receive the data from the server 400 or from the external device. The communicator 150 may externally output the computation result performed by the controller 130.

The communicator 150 may output the preview image to the server 400 or output the information on the type of the content identified in the preview image to the server 400. The communicator 150 may output the information on the image stored in the storage 120 or on the type of the image filter applied to the stored image to the server 400. Further, the communicator 150 output the user information or user input information stored in the storage 120 to the server 400.

Further, the communicator 150 may receive information on the type of the selected two or more image filters from the server 400.

For example, the communicator 150 may include a remote-distance network interface such as 3G module, LTE module, LTE-A module, Wi-Fi module, WiGig module, Ultra Wide Band (UWB) module, and LAN card, etc. Further, the communicator 150 may include a short-distance network interface such as magnetic secure (MST) module, Bluetooth module, NFC module, RFID module, ZigBee module, Z-Wave module, and infrared ray module, etc. Further, the communicator 150 may include other network interfaces.

Figure 3:
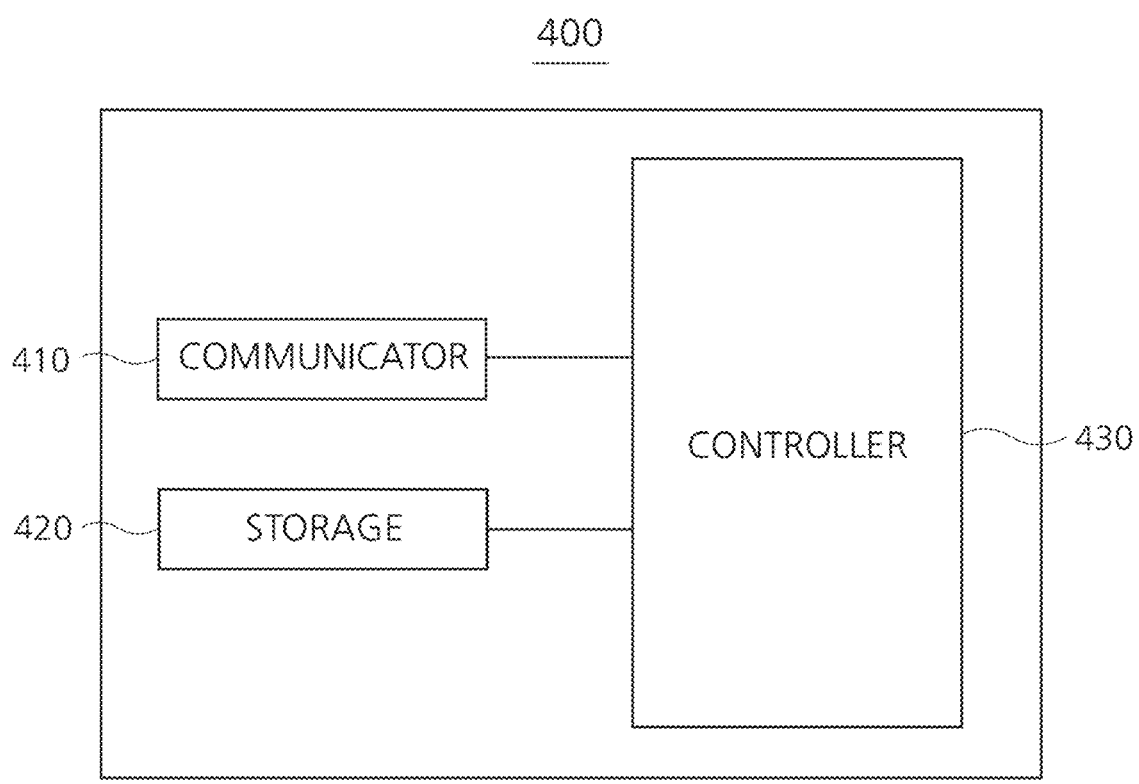
FIG. 3 is a block diagram illustrating a configuration of a server according to the embodiment of the present disclosure.

FIG. 3 is a block diagram illustrating a configuration of a server according to the embodiment of the present disclosure. Referring to FIGS. 1 and 3, the server 400 may include a communicator 410, storage 420 and controller 430.

The communicator 410 may output data outside of the server 400 or receive data from outside. The communicator 410 may output data to the plurality of terminals 100~300. The communicator 410 may receive data from the plurality of terminals 100~300. The communicator 410 may output the computation results performed by the controller 430 to outside. Further, the communicator 410 may output the data stored in the storage 420 to outside.

The communicator 410 may receive an image from at least one of the plurality of terminals 100~300. The image may be a preview image converted from light reflected from at least one of surroundings of the plurality of terminals 100~300. Otherwise, the image may be an image stored in at least one of the plurality of terminals 100~300. In the case where an image filter is applied to the received image, the communicator 410 may receive information on the type of the image filter applied to the received image together. Otherwise, the communicator 410 may receive information on the image and the type of the content included in the image from at least one of the plurality of terminals 100~300. The communicator 410 may receive user input information or user information from at least one of the plurality of terminals 100~300.

The data to be output by the communicator 410 or the data received by the communicator 410 may be stored in the storage 420. Further, the communicator 410 may transmit information on a mechanical learning model learned in the controller 430 to one of the plurality of terminals 100~300.

The communicator 410 may include a long-distance network interface such as, for example, 3G module, LTE module, LTE-A module, Wi-Fi module, WiGig module, UWB module, and LAN card, etc. Further, the communicator 410 may include a short-distance network interface such as Magnetic Secure Transmission (MST), Bluetooth module, NFC module, RFID module, ZigBee module, Z-Wave module, and Infrared module, etc. Further, the communicator 410 may include other network interfaces.

The storage 420 may store applications, programs such as application programming interface (API) and various types of data. The storage 420 may store commands executable by the controller 430. For example, the application may be an application for providing a service of recommending an image filter applicable to an image. The storage 420 may store at least one of the image received through the communicator 410, information on the type of the image filter applied to the image, and information on the type of the content included in the image. Otherwise, the storage 420 may store at least one user input information or user information of the plurality of terminals 100~300 received through the communicator 410. Otherwise the storage 420 may store at least one user input information and user information of the plurality of terminals 100~300 received through the communicator 410.

The storage 420 may include at least one of a volatile memory or non-volatile memory. For example, the storage 420 may include at least one of a flash memory, Read Only Memory (ROM), Random Access Memory (RAM), Electrically Erasable ROM (EEROM), Erasable Programmable ROM (EPROM), Electrically Erasable Programmable ROM (EEPROM), Hard Disk Drive (HDD) or register. For example, the storage 420 may include a file system, database, or embedded database, etc.

The controller 430 or each of the configuration elements included in the controller 430 may be embodied in the form of software or hardware. For example, the software may be embodied by program execution commands such as mechanical code, firmware code, embedded code, and application, etc. The hardware may be electric electronic circuit, processor, computer, pressure sensor, inertia sensor, microelectromechanical system (MEMS), passive elements, or a combination thereof.

The controller 430 may execute the commands and applications stored in the storage 420. For example, the controller 430 may identify the type of the content included in the image received from at least one of the plurality of terminals 100~300 by executing the application. Otherwise, the controller 430 may select at least two or more image filters predicted to have a high probability to be selected by the user of a certain terminal from among the plurality of terminals 100~300 by executing the application stored in the storage 420. For example, the controller 430 may select at least two or more image filters predicted to have a high probability to be selected by the user of a certain terminal based on the information on the type of the content included in the image received from at least one of the plurality of terminals 100~300 and information on the type of the selected filter.

In another example, the controller 430 may select at least two or more image filters predicted to have a high probability to be selected by the user of a certain terminal based on the user information received from at least one of the plurality of terminals 100~300, information on the type of the content included in the image and the information on the type of the selected filter by executing the application stored in the storage 420.

In another example, the controller 430 may select at least two or more image filters predicted to have a high probability to be selected by the user of a certain terminal based on the user input information received from at least one of the plurality of terminals 100~300, information on the type of the content included in the image, and information on the of the selected filter by executing the application stored in the storage 420.

Operations of the controller 430 may be explained with reference to FIGS. 4 to 14.

Figure 4:
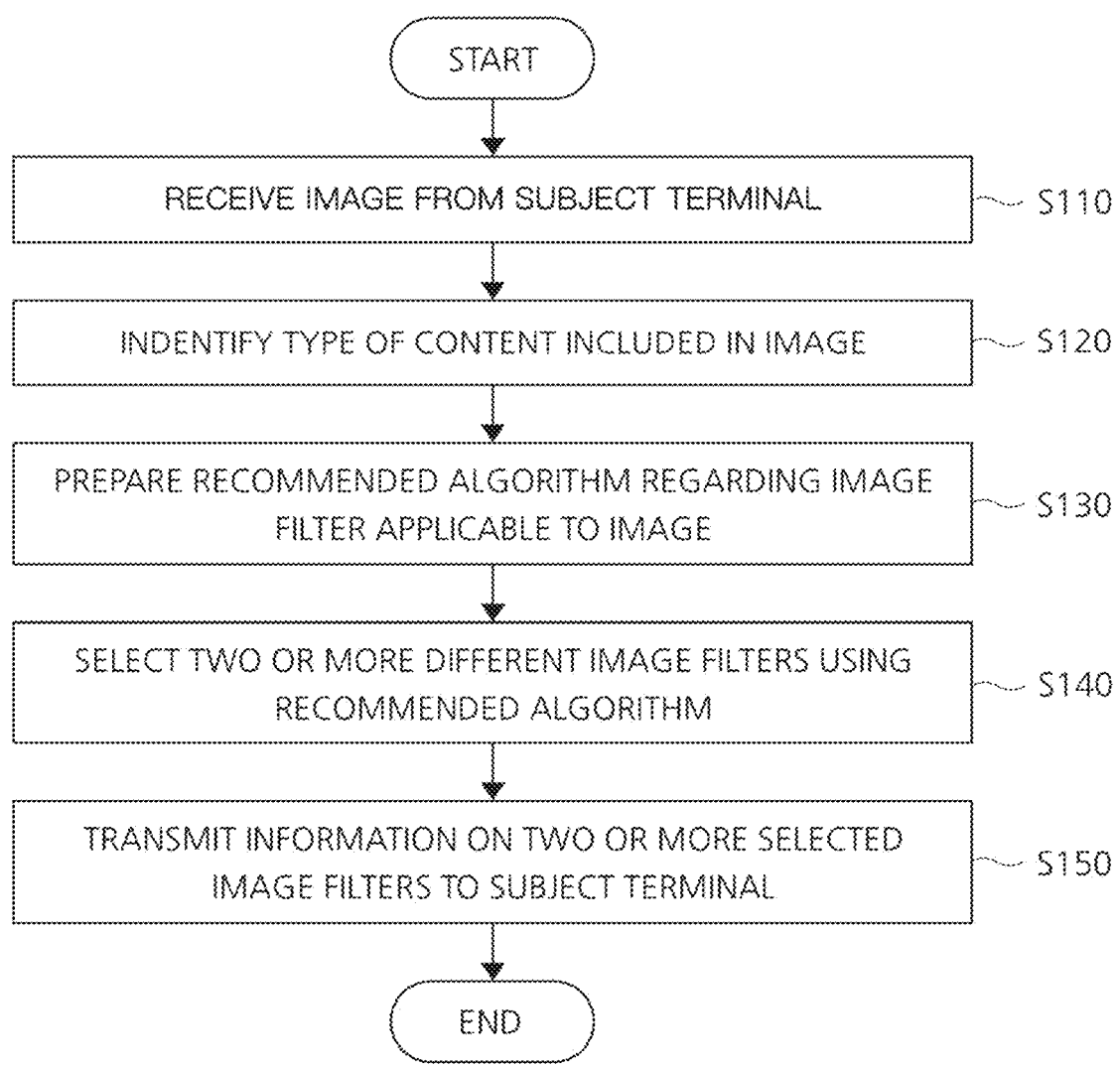
FIG. 4 is a block diagram illustrating an operating method of the server according to the embodiment of the present disclosure.

FIG. 4 is a block diagram illustrating an operating method of a server according to an embodiment of the present disclosure. At step S110, the communicator 410 of the server 400 may receive an image from a subject terminal 100. For explanation of the present disclosure, it is to be assumed that the subject terminal 100 is a first terminal 100. For example, the server 400 may execute an application that provides a service of enabling selection of an image filter to be applied to the image being input through the communicator 410.

At step S120, the controller 430 of the server 400 may identify the type of the content included in the image. For example, the controller 430 of the server 400 may identify the type of the content included in the image using a prepared learning model.

The prepared learning model may be a data recognition model being used to identify the type of the content included in the image received through the application. The data recognition model may be a model that is based on an artificial neural network. For example, the learning model may be a model such as Deep Neural Network (DNN), Recurrent Neural Network (RNN), and Bidirectional Recurrent Deep Neural Network (BRDNN) used as the data recognition model, but there is no limitation thereto.

The prepared learning model may be a learning model for identifying the type of the content included in the image. The learning model for identifying the type of the content may be a result learned regarding a correlation between image data of numerous photographs and types of contents included in the numerous photographs. For example, the server 400 may learn the correlation between the image data of the numerous photographs and the types of contents included in the numerous photographs. The server 400 may train an artificial neural network based on the learning result, and create the learning model for identifying the type of the content included in the image.

At step S130, the controller 430 of the server 400 may prepare a recommended algorithm regarding the image filter applicable to the image. For example, the prepared recommended algorithm may be the data recognition model being used for selecting the image filter applicable to the preview image. The data recognition model may be a model that is based on the artificial neural network. For example, the learning model may be the data recognition model such as DNN, RNN and BRDNN, but there is no limitation thereto.

The prepared recommended algorithm may be the learning model for recommending the image filter applicable to the image. The learning model for recommending the image filter may be the learning result regarding the correlation between the types of contents included in the numerous images and the types of image filters selected by the user in order to correct the numerous images. For example, the server 400 may learn the correlation between the types of contents included in the numerous images and the type of the image filter selected in order to correct the numerous images. The server 400 may train the artificial neural network based on the learning result, and create the learning model for selecting the type of the image filter applicable to the image.

Otherwise, the prepared recommended algorithm may be learned based on the information received from the remaining terminals 200, 300 except the subject terminal from among the plurality of terminals 100~300. Embodiments regarding this case may be explained with reference to FIG. 5.

At step S140, the controller 430 of the server 400 may select two or more image filters using the recommended algorithm for selecting the image filter. For example, the controller 430 of the server 400 may select the two or more image filters in order to correct the content included in the image received from the subject terminal 100.

For example, the controller 430 of the server 400 may select the two or more image filters predicted to have a high probability to be selected by the user of the subject terminal 100 according to the type of the content included in the image. For example, the controller 430 of the server 400 may select the image filter predicted to have a highest probability to be selected by the user of the terminal 100 and the image filter predicted to have a second highest probability to be selected by the user of the terminal 100 according to the type of the content included in the image.

At step S150, the communicator 410 of the server 400 may transmit information on the two or more selected image filters to the subject terminal 100. For example, the outputter 140 of the subject terminal 100 may divide the image into two or more image areas based on the information on the two or more image filters, and apply each of the selected two or more image filters to the two or more image areas.

Figure 5:
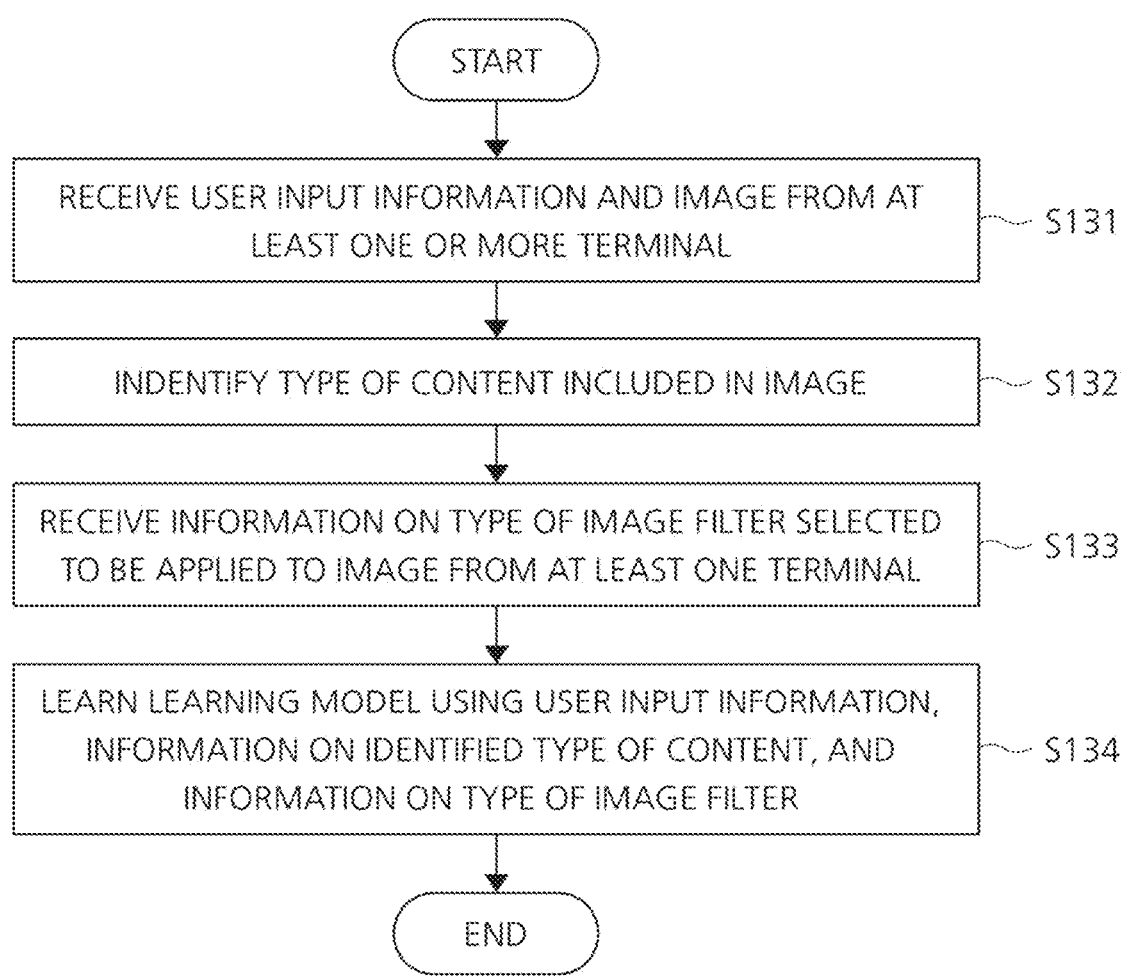
FIG. 5 is a flowchart illustrating a method for preparing a recommended algorithm by the server according to the embodiment of the present disclosure.

FIG. 5 is a flowchart illustrating the method in which the server prepares the recommended algorithm according to the embodiment of the present disclosure. Referring to FIGS. 4 and 5, at step S131, the communicator 410 of the terminal 400 may receive user input information and image from at least one or more terminal. For example, at least one or more terminal may be the remaining terminals 200, 300 from among the plurality of terminals 100~300 except the subject terminal 100. The user input information may be information created from a touch drag input being input into the display 141 of the subject terminal 100. The method in which the user input information is being created may be explained with reference to FIGS. 6 to 8.

Figure 6:
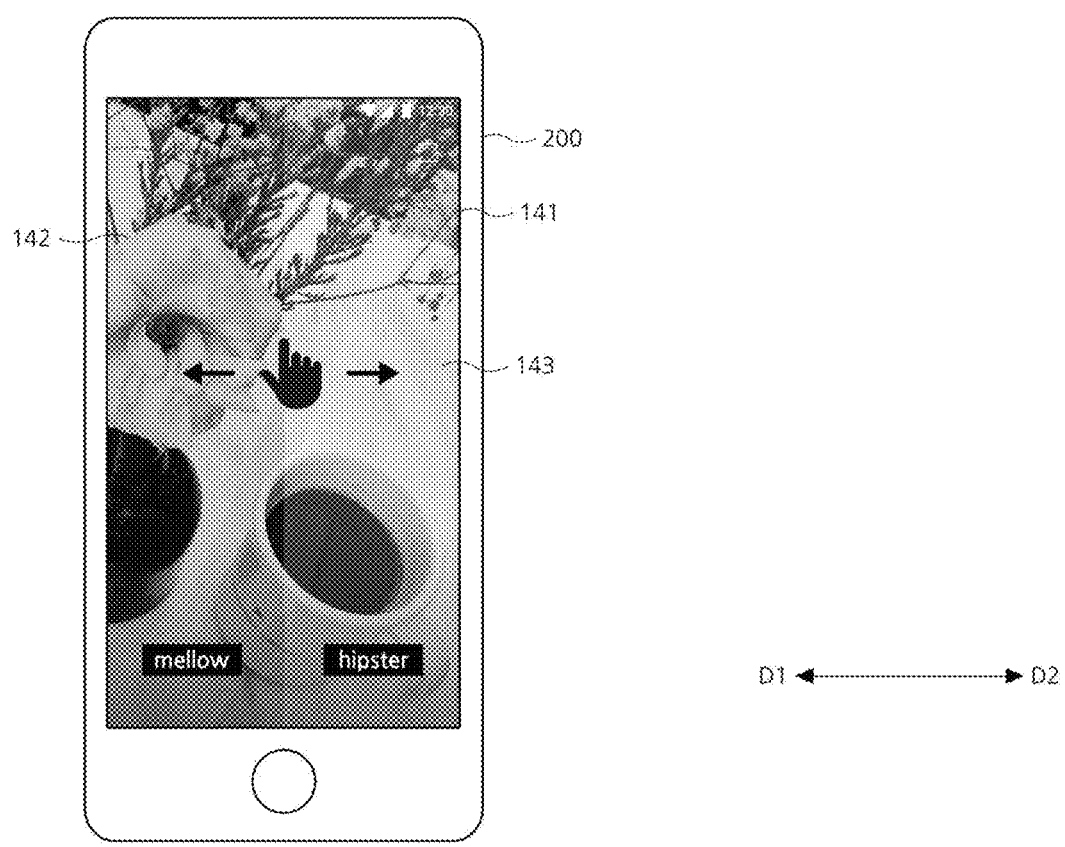
FIGS. 6 to 8 are views illustrating a method for creating user input information from the terminal according to the embodiment of the present disclosure.
Figure 7:
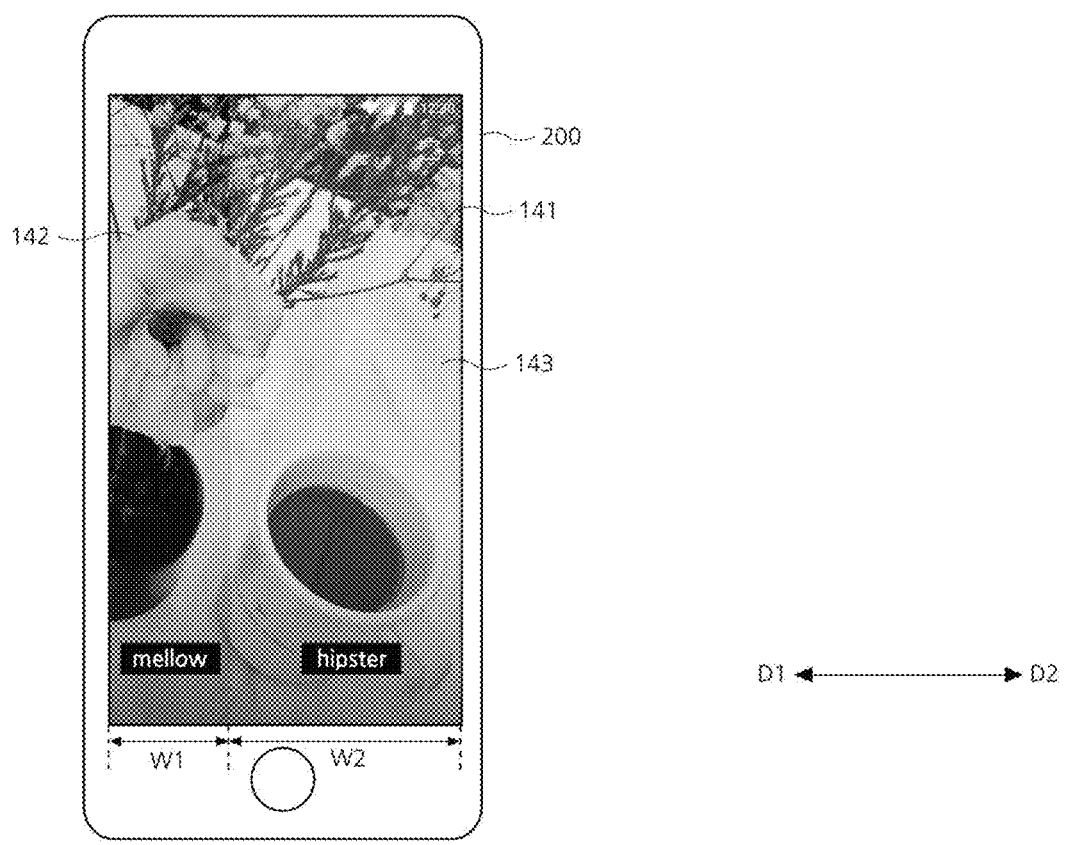
Figure 8:
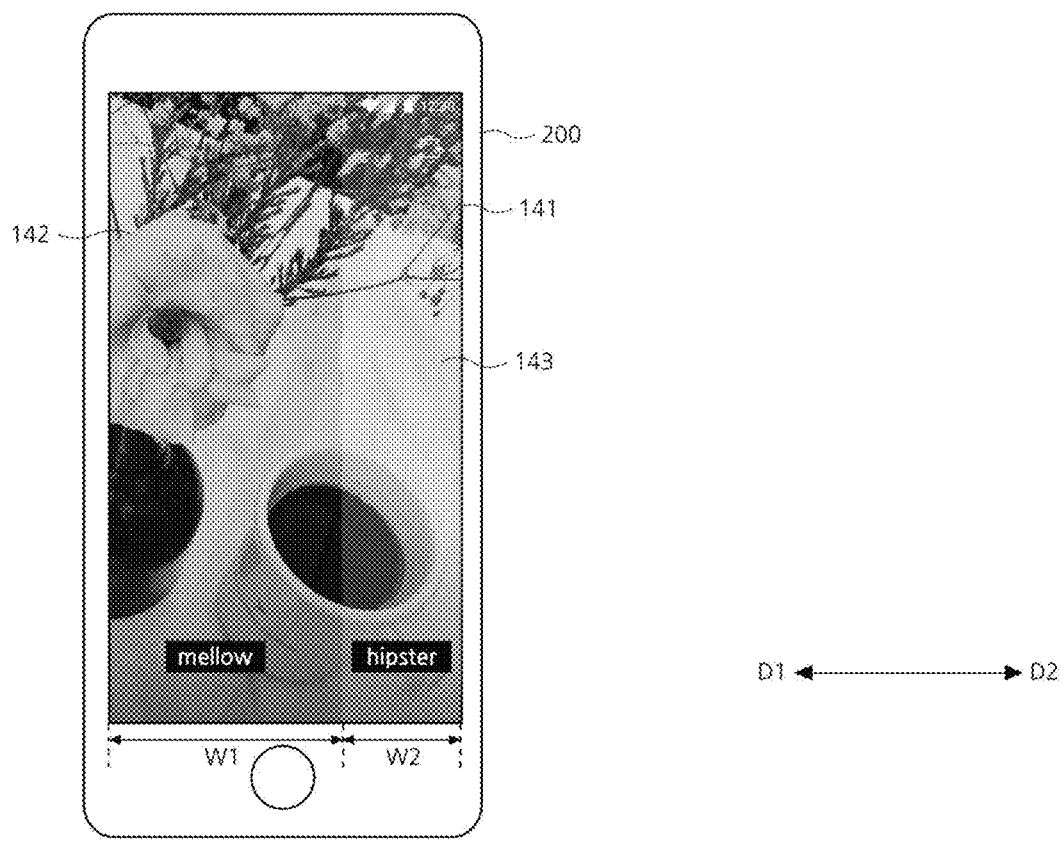

FIGS. 6 to 8 are views illustrating the method in which the user input information is created from the terminal according to the embodiment of the present disclosure.

It is assumed that the terminal illustrated in FIG. 6 is a second terminal 200. The present disclosure is not limited thereto, and thus the terminal illustrated in FIG. 6 may be embodied as at least one of the second terminal 200 and the third terminal 300.

A preview image may be displayed through the outputter 141 of the second terminal 200. The preview image may be created from light reflected from surroundings of the second terminal input through the inputter 110 of the second terminal 200. For example, a first display area 142 of the display 141 may correspond to a first image area of the preview image, and a second display area 143 may correspond to a second image area of the preview image.

To each of the first image area being displayed through the first display area 142 and the second image area being displayed through the second display area 143, different image filters may be applied. For example, in the first display area 142, the first image area to which a first image filter (for example, 'mellow' image filter) is applied may be displayed, and in the second display area 143, the second image area to which the second image filter (for example, 'hipster' image filter) is applied may be displayed. That is, the first image area may be a range in the preview image to which the first image filter is applied, and the second image area may be a range in the preview image to which the second image filter is applied.

For example, the first image area may correspond to a left partial area of the preview image. The second image area may correspond to a right partial area of the preview image. Further, the second image area may correspond to the remaining area in the preview image except the first image area. The present disclosure is not limited thereto, and thus the first image area may correspond to an upper partial area of the preview image. The second image area may correspond to a lower partial area of the preview image. Further, the second image area may correspond to the remaining area in the preview image except the first image area.

For example, the first image filter applied to the first image area may be an image filter predicted to have a highest probability to be selected by the user of the terminal 100 according to the type of the object included in the preview image in the server 400. The second image filter applied to the second image area may be an image filter predicted to have a second highest probability to be selected by the user of the terminal 100 according to the object included in the preview image in the server 400.

For example, the display 141 of the second terminal 200 may receive a touch drag input that starts from an arbitrary point of a boundary of the first display area 142 and the second display area 143. Referring to FIG. 6, the second terminal 200 may receive one of the user input of touching an arbitrary point of a boundary of the first display area 142 and the second display area 143 and dragging towards a first direction D1 or dragging towards a second direction D2 that is opposite to the first direction D1. For example, the first direction D1 may be a direction from the second display area 143 towards the first display area 142, and the second direction D2 may be a direction from the first display area 142 towards the second display area 143. The second terminal 200 may adjust a ratio of the first image area or the second image area of the preview image based on the user input.

Referring to FIG. 7, in the case where the touch drag input that starts from the arbitrary point of the boundary of the first display area 142 and the second display area 143 towards the first direction D1 is received, the terminal 100 may increase the ratio of the second image area in the preview image to be proportionate to the distance between the starting point and end point of the touch drag input. Further, as much as the ratio of the second image area increased, the ratio of the first image area will decrease. If the size of the second image area is increased, the size of the second display area 143 corresponding to the second image area may increase together.

In the case where the touch drag input that starts from the arbitrary point of the boundary of the first display area 142 and the second display area 143 towards the first direction D1 is received, the second terminal 200 may increase the ratio of the second image area in the preview image to be proportionate to the distance between the starting point and end point of the touch drag input. Further, as much as the ratio of the second image area increased, the ratio of the first image area will decrease. If the size of the second image area is increased, the size of the second display area 143 corresponding to the second image area may increase together.

Referring to FIG. 8, in the case where the touch drag input that starts from the arbitrary point of the boundary of the first display area 142 and the second display area 143 towards the second direction D2 is received, the second terminal 200 may increase the ratio of the first image area in the preview image to be proportionate to the distance between the starting point and end point of the touch drag input. Further, as much as the ratio of the first image area increased, the ratio of the second image area will decrease. If the size of the first image area is increased, the size of the first display area 142 corresponding to the first image area may increase together.

If the ratio of the first image area becomes greater than the second image area, a width W1 of the first image area being displayed in the first display area 142 may become greater than a width W2 of the second image area being displayed in the second display area 143, and the size of the first image area to which the first image filter is applied may become greater than the second image area to which the second image filter is applied in the preview image.

For example, the second terminal 200 may create information on a number of times the ratio of the first image area became greater than the ratio of the second image area or a number of times the ratio of the second image area became greater than the ratio of the first image area as the user input information. The second terminal 200 may transmit the created user input information to the server 400.

In another example, the second terminal 200 may create information on a time when the ratio of the first image area became greater than the ratio of the second image area or a time when the ratio of the second image area became greater than the ratio of the first image area as the user input information. The second terminal 200 may transmit the created user input information to the server 400.

The third terminal 300 may create the user input information in the method similar to or identical to the method explained with reference to FIGS. 6 to 8. The third terminal 300 may transmit the created user information to the server 400.

Referring to FIG. 5 again, at step S132, the controller 430 of the server 400 may identify the type of the content included in the image. For example, the controller 430 of the server 400 may identify the type of the content included in the image using the prepared learning model.

At step S133, the communicator 410 of the server 400 may receive the information on the type of the image filter selected to be applied to the image from at least one or more terminals 200, 300. For example, the image filter selected to be applied to the image may be an image filter that each user of the at least one or more terminal 200, 300 applied to the image stored in each user's terminal.

At step S134, the controller 430 of the server 400 may learn a learning model using the user input information received from the at least one or more terminal 200, 300, the type of the content identified from the image and the type of the filter applied. The learning model may be a result learned regarding a correlation between the user input information received from the at least one or more terminal 200, 300, and the type of the content identified from the image received from the at least one or more terminal 200, 300 and the type of the image filter selected to be applied to the image.

The controller 430 of the server 400 may train the artificial neural network based on the learned result, and create a learning model for selecting two or more different image filters. The controller 430 of the server 400 may select at least two or more image filters predicted to have a high probability to be selected by the user of the subject terminal 100 using the image received from the subject terminal 100 and the learning model.

Figure 9:
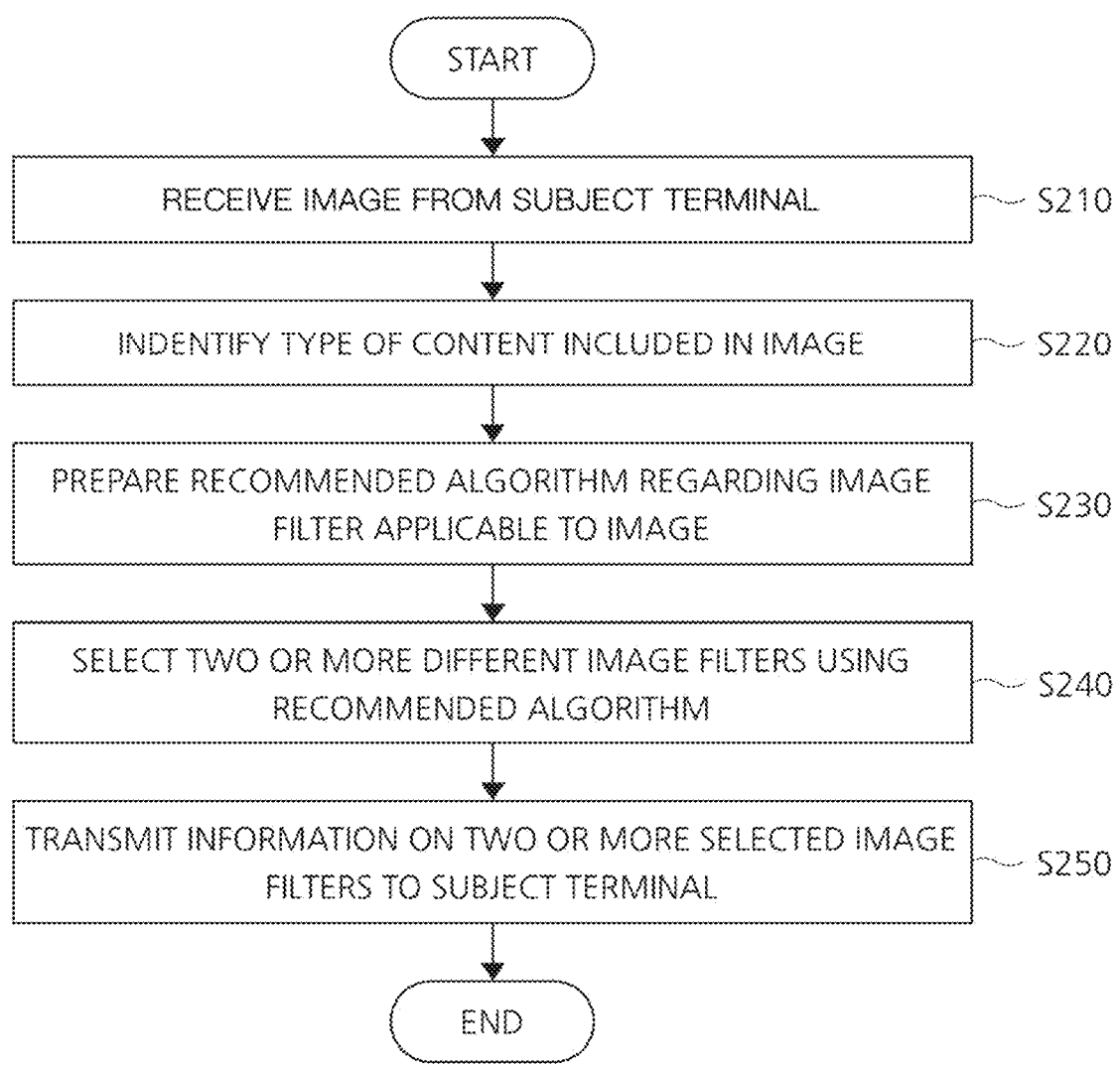
FIG. 9 is a flowchart illustrating an operating method of the server according to another embodiment of the present disclosure.

FIG. 9 is a flowchart illustrating the operating method of the server according to another embodiment of the present disclosure. At step S210, the communicator 410 of the server 400 may receive user information and an image from the subject terminal 100. The user information may be profile information that the user of the subject terminal 100 input into the user's terminal. The profile information may include at least one of hobby information, gender information, age information and information on a type of a preferred image filter of the user of the terminal. For example, the server 400 may execute an application that provides a service that may recommend the image filter applicable to the image received from the subject terminal 100.

At step S220, the controller 430 of the server 400 may identify the type of the content included in the image. For example, the controller 430 of the server 400 may identify the type of the content included in the image using the prepared learning model.

At step S230, the controller 430 of the server 400 may prepare the recommended algorithm regarding the image filter applicable to the image. For example, the prepared recommended algorithm may be the data recognition model being used to select the image filter applicable to the image through the application. The method in which the controller of the server 400 prepares the recommended algorithm may be explained with reference to FIG. 10.

At step S240, the controller 430 of the server 400 may select the two or more image filters using the recommended algorithm for selecting the image filter. For example, the controller 430 of the server 400 may select the two or more image filters for correcting the content included in the image received from the subject terminal 100. The controller 430 of the server 400 may select the two or more different image filters using the user information and image received from the subject terminal and the recommend algorithm.

For example, the controller 430 of the server 400 may select the two or more image filters predicted to have a high probability to be selected by the user of the subject terminal 100 according to the user information of the user of the subject terminal 100 and the type of the content included in the image. For example, the controller 430 of the server 400 may select the image filter predicted to have the highest probability to be selected by the user of the terminal 100 and the image filter predicted to have the second highest probability to be selected by the user of the terminal 100 according to the user information of the user of the subject terminal 100 and the type of the content included in the image.

At step S250, the communicator 410 of the server 400 may transmit the information on the selected two or more image filters to the subject terminal 100. For example, the outputter 140 of the subject terminal 100 may divide the image into two or more image areas, and apply the selected two or more image filters each selected for the two or more image areas.

Figure 10:
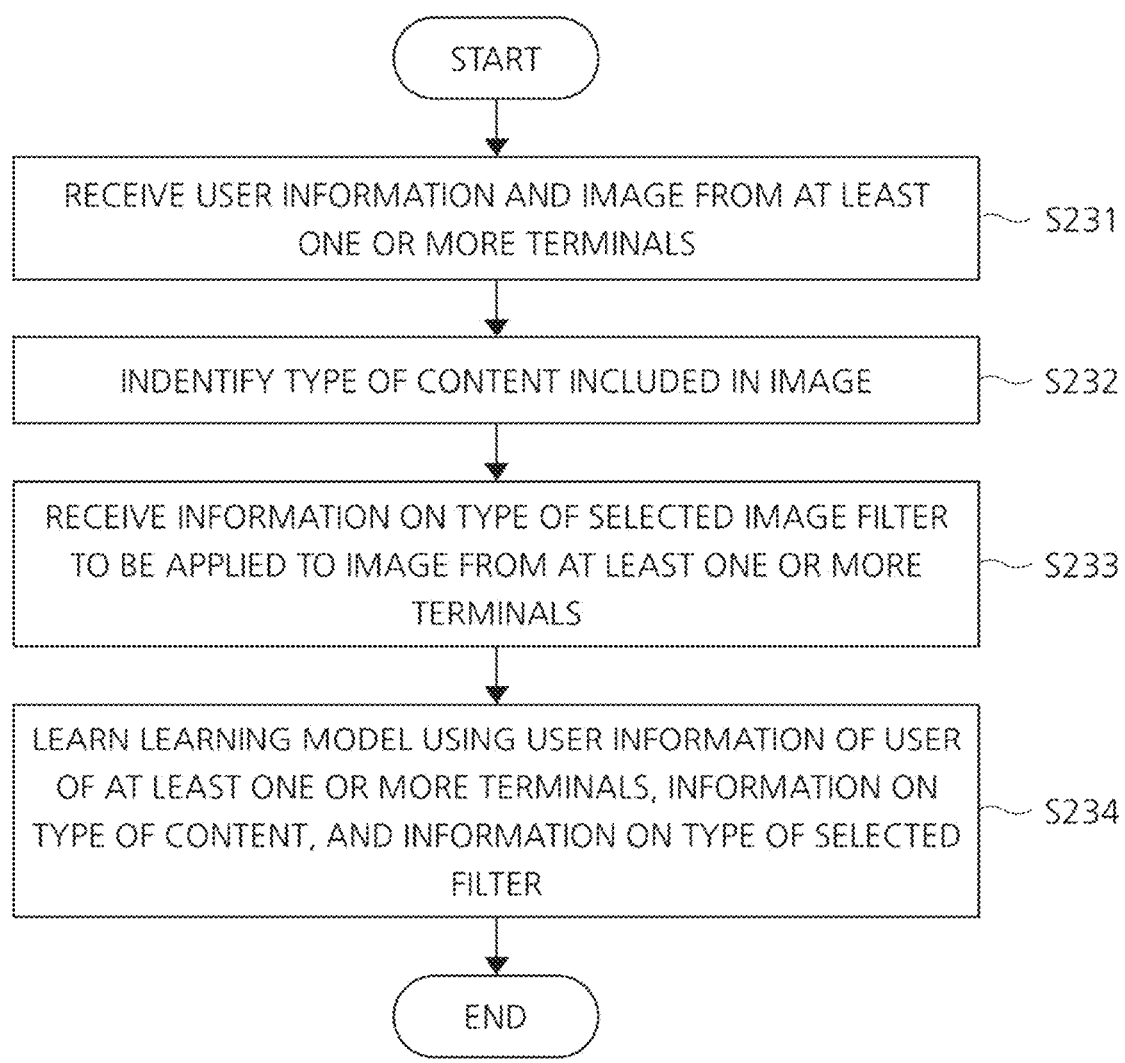
FIG. 10 is a flowchart illustrating a method for preparing the recommended algorithm by the server according to another embodiment of the present disclosure.

FIG. 10 is a flowchart illustrating the method in which the server prepares the recommended algorithm according to another embodiment of the present disclosure. Referring to FIGS. 3, 9 and 10, at step S231, the communicator 410 of the server 400 may receive the user information and image from the at least one or more terminal. For example, the at least one or more terminal 200, 300 may be the remaining terminals except the subject terminal 100 from among the plurality of terminals 100–300. The user information may be profile information that each user of the at least one or more terminal 200, 300 input into each user's terminal. The profile information may include at least one of the hobby information, gender information and information on the preferred image filter of the user of the terminal.

At step S232, The controller 430 of the server 400 may identify the type of the content included in the image. For example, the controller 430 of the server 400 may identify the type of the content included in the image using the prepared learning model.

At step S233, the communicator 410 of the server 400 may receive information on the type of the selected image filter to be applied to the image from the at least one or more terminal 200, 300. For example, the selected image filter may be the image filter that each user of the at least one or more terminal 200, 300 selected to apply to the image input to each user's terminal.

At step S234, the controller 430 of the server 400 may learn the learning model using the user information received from the at least one or more terminal 200, 300, the type of the content identified in the image and the type of the selected filter. The learning model may be a result learned regarding the user information received from the at least one or more terminal 200, 300, and the correlation between the type of the content identified from the image and the type of the applied filter.

The controller 430 of the server 400 may create the learning model for selecting the two or more different image filters by training the artificial neural network based on the result of the learning. The controller 430 may select the two or more image filters predicted to have a high probability to be selected by the user of the subject terminal 100 using the user information on the user of the subject terminal 100 and the type of the content included in the image.

Figure 11:
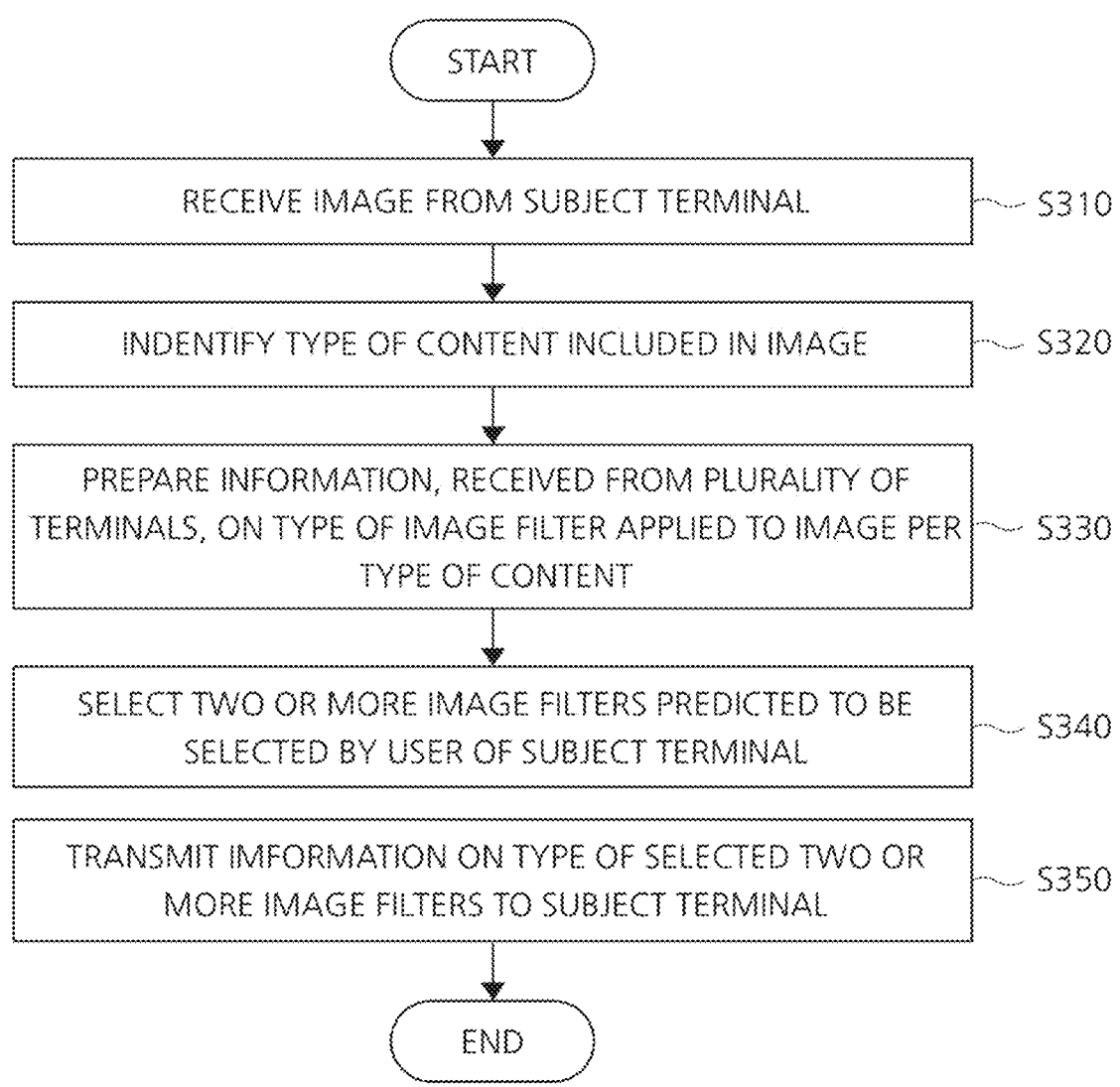
FIG. 11 is a flowchart illustrating an operating method of the server according to another embodiment of the present disclosure.

FIG. 11 is a flowchart illustrating the operating method of the server according to another embodiment of the present disclosure. Referring to FIGS. 3 and 11, at step S310, the communicator 410 of the server 400 may receive an image from the subject terminal 100.

At step S320, the controller 430 of the server 400 may identify the type of the content included in the image. For example, the controller 430 of the server 400 may identify the type of the content included in the image using the learning model prepared.

At step S330, the server 400 may prepare the information on the type of the image filter selected per type of the content. At step S340, the server 400 may select the two or more image filters predicted to be selected by the user of the subject terminal 100 based on the information on the type of the image filter selected per type of the content. Step S330 and step 340 may be explained in detail with reference to FIGS. 12 and 13.

Figure 12:
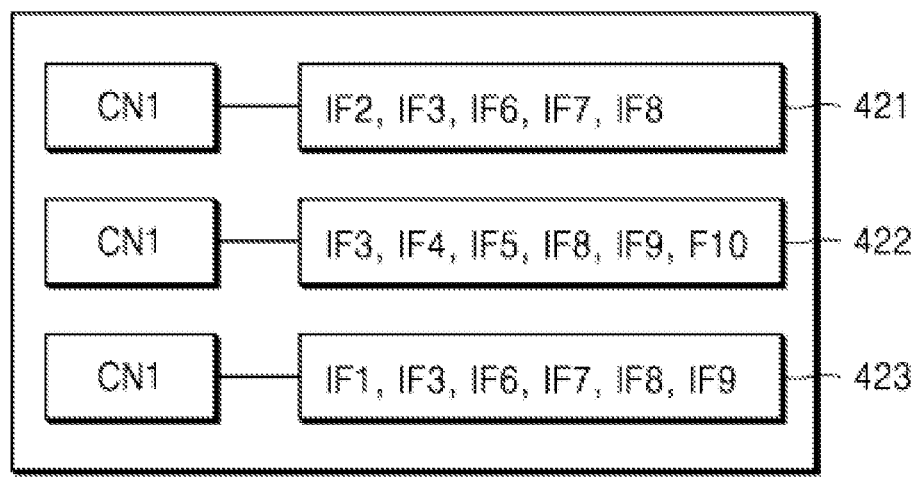
FIG. 12 is a view illustrating information on a type of an image filter selected per type of the content prepared in the server according to the embodiment of the present disclosure.

FIG. 12 is a view illustrating the information on the type of the image filter selected per type of the content prepared in the server according to an embodiment of the present disclosure. Referring to FIGS. 3, 11 and 12, information included in a list may be received from the plurality of terminals 100~300. The list may be stored in the storage 420 of the server 400.

For example, the first image filter history information 421 may include information on the type of the image filter applied to the image including a first content CN1, the information being received from the first terminal 100. The user of the first terminal 100 may select a second image filter IF2, third image filter IF3, sixth image filter IF6, seventh image filter IF7, and eighth image filter IF8 as the image filter to be applied to the image including the first content CN1.

Information on the selected filter (for example, second image filter IF2, third image filter, sixth image filter IF6, seventh image filter IF7, or eighth image filter IF8) may be transmitted to the server 400 every time each image filter is selected to be applied to the image including the first content CN1 by the user of the first terminal 100.

Second image filter history information 422 may include information on the type of the image filter applied to the image including the first content CN1, the information being received from the second terminal 200. The user of the second terminal 200 may select the third image filter IF3, fourth image filter IF3, fifth image filter IF5, eighth image filter IF8, ninth image filter IF9, and tenth image filter IF10 as the image filter to be applied to the image including the first content CN1.

Information on the selected filter (for example, the third image filter IF3, fourth image filter IF4, fifth image filter IF5, eighth image filter IF8, ninth image filter IF9, or tenth image filter IF10) may be transmitted to the server 400 every time each image filter is selected to be applied to the image including the first content CN1 by the user of the second terminal 200.

Third image filter history information 423 may include information on the type of the image filter selected to be applied to the image including the first content CN1, the information being received from the third terminal 300. The user of the third terminal 300 may select the first image filter IF1, third image filter IF3, sixth image filter IF6, seventh image filter IF7, eighth image filter IF8 and ninth image filter IF9 as the image filter to be applied to the image including the first content CN1.

Information on the selected filter (for example, the first image filter IF1, third image filter IF3, sixth image filter IF6, seventh image filter IF7, eighth image filter IF8, or the ninth image filter IF9) may be transmitted to the server 400 every time each image filter is transmitted to be applied to the image including the first content CN1 by the user of the third terminal 300.

The type of the content identified from the image received from the subject terminal 100 may be the first content CN1. The server 400 may use the first to third image filter history information 421~423 received from each of the plurality of terminals 100~300 to create the information on the type of the image filter on two or more image filters to be provided in the subject terminal 100. The first to third image filter history information 421~423 received from each of the plurality of terminals 100~300 may be received prior to receiving the image from the subject terminal 100 and be stored in the storage 420 of the server 420.

The controller 430 of the server 400 may use a collaborative filtering algorithm as the recommended algorithm. The controller 430 of the server 400 may create the information on the type of the two or more image filters to be provided in the subject terminal 100 using the collaborative filtering algorithm. More specifically, the controller 430 of the server 400 may select the image filter predicted to have a high probability to be selected by the user of the subject terminal 100 using the collaborative filtering algorithm.

The controller 430 of the server 400 may select information including a most number of image filters that overlap with the image filters included in the first image filter history information 421 of the second image filter history information 422 and the third image filter history information 423. The second image filter history information 422 may include two image filters that overlap with the first image filter history information 421. For example, the image filters that overlap between the second image filter history information 422 and the first image filter history information 421 may be the third image filter IF3 and the eighth image filter IF8. Further, the third image filter history information 423 may include four image filters that overlap with the first image filter history information 421. For example, the image filters that overlap between the third image filter history information 423 and the first image filter history information 421 may be the third image filter IF3, sixth image filter IF6, seventh image filter IF7 and eighth image filter IF8.

The information that includes the most number of image filters that overlap with the first image filter history information 421 is the third image filter history information 423. Therefore, the controller 430 of the server 400 may predict that the image filter selected by the user of the third terminal 300 will be preferred by the user of the subject terminal 100.

The controller 430 of the server 400 may select the type of the image filter to be provided to the subject terminal 100 based on the third image filter history information 423. For example, the controller 430 of the server 400 may select two remaining image filters that do not overlap with the type of the image filters included in the first image filter history information 421 from among the type of the image filters included in the third image filter history information 423 as the image filter to be preferred by the subject terminal 100. The remaining two image filters may be the first image filter IF1 and the ninth image filter IF9.

Referring to FIG. 11 again, at step S350, the communicator 410 of the server 400 may transmit the information on the type of the selected two or more image filters to the subject terminal. The server 400 may select the image filter predicted to be preferred by the user of the subject terminal 100 using the collaborative filtering algorithm and transmit the information on the type of the selected image filter to the subject terminal 100. The method in which the server 400 transmits the information on the type of the image filter to the subject terminal 100 may be explained with reference to FIG. 9.

Figure 13:
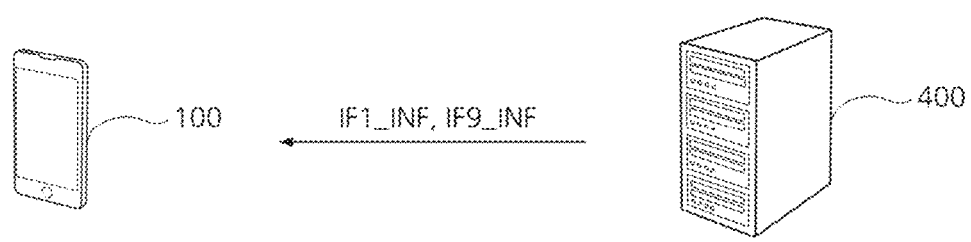
FIG. 13 is a view illustrating the terminal and a communication method of the server according to the embodiment of the present disclosure.

FIG. 13 is a view illustrating the terminal and the communication method of the server according to an embodiment of the present disclosure. Referring to FIGS. 11 to 13, the server 400 may transmit the first image filter information IF1_INF and the ninth image filter information INF_INF to the subject terminal 100 as the information on the type of the image filter.

Figure 14:
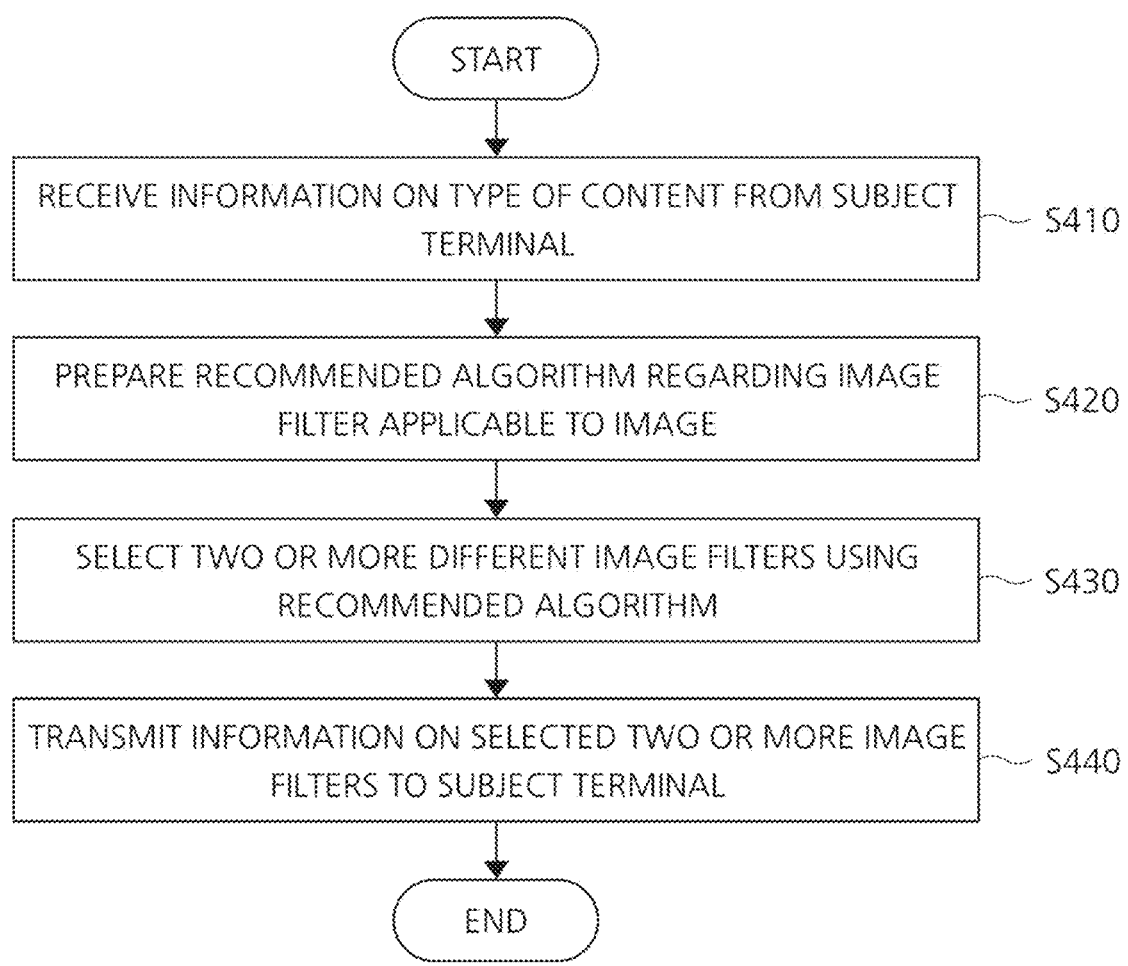
FIG. 14 is a flowchart illustrating an operating method of the server according to another embodiment of the present disclosure.

FIG. 14 is a flowchart that illustrates the operating method of the server according to another embodiment of the present disclosure. Referring to FIGS. 4 and 14, at step S410, the communicator 410 of the server 400 may receive the information on the type of the content from the subject terminal 100. For example, the subject terminal 100 may execute the application that provides the service of enabling selection of the image filter being applied to the image. The subject terminal 100 may identify the type of the content included in the image using the prepared learning model.

The prepared learning model may be a learning model for identifying the type of the content included in the image. The learning model for identifying the type of the content may be a result of learning regarding the correlation between image data of a numerous photographs and types of contents included in the numerous photographs. The subject terminal 100 may predict the type of the content included in the image using the learning model for identifying the type of the content and the image. The information on the predicted type of the content may be transmitted to the server 400 from the subject terminal 100.

At step S420, the controller 430 of the server 400 may prepare the recommended algorithm regarding the image filter applicable to the image. At step S430, the controller 430 of the server 400 may select the two or more image filters using the recommended algorithm for selecting the image filter. Further, at step S440, the communicator 410 of the server 400 may transmit the information on the two or more selected image filters to the subject terminal 100. Step S420 to step S440 may each be similar or identical to step S130 to step S150 explained with reference to FIG. 4. Therefore, detailed explanation on step S420 to step 440 will be omitted.

As explained with reference to FIGS. 1 to 14, the server 400 according to the embodiment of the present disclosure may automatically recommend two or more different image filters appropriate to the type of the content included in the image to be photographed by the user. As the server 400 automatically recommends the two or more different image filters, convenience of the user may be improved.

The embodiments explained above may also be embodied in the form of a record medium that includes commands executable by a computer, such as a program module executable by a computer. The computer-readable record medium may be an arbitrary available medium accessible by a computer, and may include all volatile and non-volatile media, and separable and non-separable media.

Further, the computer-readable medium may include computer storage media or communication media. The computer storage medium may include computer-readable commands, data structure, program modules or volatile and non-volatile, separable and non-separable media embodied in an arbitrary method or technology for storing information such as other data. The communication medium may traditionally include computer-readable commands, program modules or other data of modulated data signals such as carrier waves, or other output mechanisms, and may include arbitrary information delivery medium.

Embodiments of the present disclosure were explained with reference to the drawings attached hereto, but a person skilled in the art will understand that the present disclosure may be implemented in other specific forms without changing its technical idea or essential characteristics. Therefore, the embodiments disclosed hereinabove must be understood as exemplary and not limiting the present disclosure in all aspects.

What is claimed is:

1. An operating method of a server, the method comprising:
   receiving a first image from a subject terminal among a plurality of terminals;
   identifying a type of a first content included in the first image;
   obtaining a recommended algorithm regarding an image filter applicable to the first image;
   selecting two or more different image filters corresponding to the type of the first content using the recommended algorithm; and
   transmitting information on the selected two or more different image filters to the subject terminal,
   wherein the obtaining comprises obtaining:
   image filter history information, on a type of an image filter that has been previously selected, by the subject terminal, to be applied to a second image including the first content and
   image filter history information, on a type of an image filter that has been previously selected, by each of the plurality of terminals except the subject terminal, to be applied to a third image including the first content, and
   wherein the selecting comprises:
   obtaining image filter history information of a first terminal, the image filter history information of the first terminal being predicted to be preferred by a user of the subject terminal, based on a result of comparing the image filter history information of the subject terminal and the image filter history information of the plurality of terminals, respectively; and
   selecting two or more different image filters based on a plurality of image filters included in the image filter history information of the first terminal.

2. A server comprising:
   a communicator for receiving a first image from a subject terminal from among a plurality of terminals; and
   a controller for identifying a type of a first content included in the first image, and for selecting two or more different image filters using a recommended algorithm regarding an image filter to be applied to the first image,
   wherein the controller selects a first image filter predicted to have a highest probability to be selected by a user of the subject terminal and a second image filter predicted to have a second highest probability to be selected by the user of the subject terminal using the recommended algorithm, and the communicator transmits information on the first image filter and information on the second image filter to the subject terminal, wherein the controller obtains:

image filter history information, on a type of an image filter that has been previously selected, by the subject terminal, to be applied to a second image including the first content and image filter history information, on a type of an image filter that has been previously selected, by each of the plurality of terminals except the subject terminal, to be applied to a third image including the first content, wherein the controller obtains image filter history information of a first terminal, the image filter history information of the first terminal being predicted to be preferred by the user of the subject terminal, based on a result of comparing the image filter history information of the subject terminal and the image filter history information of the plurality of terminals, respectively; and selects two or more different image filters based on a plurality of image filters included in the image filter history information of the first terminal.

3. The operating method according to claim 1, further comprising:

obtaining a learning model for the identifying the type of the first content included in the first image, the learning model being learned regarding a correlation between image data of numerous photographs and types of contents included in the numerous photographs, prior to the identifying the type of the first content included in the first image.

4. The operating method according to claim 1, further comprising:

receiving, from the subject terminal, user information that includes at least one of hobby information, gender information, age information, and information on a type of a preferred image filter of the user of the subject terminal.

5. The operating method according to claim 1, wherein the obtaining the image filter history information of the first terminal comprises:

obtaining the image filter history information of the first terminal from among the plurality of terminals except the subject terminal, based on information on image filters overlapping between the image filter history information of the subject terminal and the image filter history information of the plurality of terminals, and wherein the selecting the two or more different image filters comprises: selecting the two or more different image filters based on image filters included in the image filter history information of the first terminal and not included in the image filter history information of the subject terminal.

6. The operating method according to claim 1, wherein the identifying the type of the first content included in the first image comprises detecting whether the first content comprises at least one of a person, certain object, certain animal, certain scenery, certain pattern and certain color.

7. The operating method according to claim 1, wherein the selecting the two or more different image filters corresponding to the type of the first content using the recommended algorithm comprises selecting a first image filter predicted to have a highest probability to be selected by the user of the subject terminal and a second image filter predicted to have a second highest probability to be selected by the user of the subject terminal using the recommended algorithm.

8. A non-transitory computer-readable record medium where a program for executing the operating method according to claim 1 is recorded.

9. The server according to claim 2, wherein the controller obtains the image filter history information of the first terminal from among the plurality of terminals except the subject terminal, based on information on image filters overlapping between the image filter history information of the subject terminal and the image filter history information of the plurality of terminals, wherein the controller selects the two or more different image filters based on image filters included in the image filter history information of the first terminal and not included in the image filter history information of the subject terminal.

10. The server according to claim 2, wherein the communicator receives user information that includes at least one of hobby information, gender information, age information, and information on a type of a preferred image filter of the user of the subject terminal.

11. The operating method according to claim 4, wherein the obtaining the recommended algorithm regarding the image filter to be applied to the first image further comprises:

receiving the user information and a fourth image from each of at least one terminal of the plurality of terminals except the subject terminal;

identifying a type of a content included in the fourth image received from each of the at least one terminal;

receiving, from each of the at least one terminal, information on a type of an image filter selected to be applied to the fourth image received from each of the at least one terminal; and obtaining a learning model using the user information, information on the identified type of the content included in the fourth image, and the received information on the type of the image filter selected to be applied to the fourth image.

12. The server according to claim 10, wherein the communicator receives, from each of at least one terminal of the plurality of terminals except the subject terminal, the user information, a fourth image to which the image filter is applied, and information on a type of an image filter selected to be applied to the fourth image, and wherein the controller identifies a type of a content included in the fourth image to which the image filter is applied, and obtains the recommended algorithm for selecting the two or more different image filters, the recommended algorithm being learned regarding a correlation between the user information, the identified type of the content included in the fourth image, and the type of the image filter selected to be applied to the fourth image.

13. The operating method according to claim 11, wherein the obtaining the learning model using the user information, the information on the identified type of the content included in the fourth image, and the received information on the type of the image filter selected to be applied to the fourth image comprises obtaining the learning model for selecting the two or more different image filters regarding a correlation between the user information, and the information on the identified type of the content included in the fourth image and the received information on the type of the image filter selected to be applied to the fourth image.

14. The operating method according to claim 11, wherein the selecting the two or more different image filters corresponding to the type of the content using the recommended algorithm comprises selecting the two or more different image filters predicted to have a high probability to be selected by the user of the subject terminal using the user information received from the subject terminal, information on the type of the content identified in the first image received from the subject terminal and the learning model.

* * * * *